United States Patent Office 2,739,949
Patented Mar. 27, 1956

2,739,949
POLYMERS OF DIALKYL METHALLYLIMINO-DIALKANOATES

William O. Forshey, Jr., New Castle, Del., assignor to E. I. du Pont de Nemours and Company, Wilmington, Del., a corporation of Delaware No Drawing. Application May 15, 1952,
Serial No. 288,015

12 Claims. (Cl. 260—2.1)

This invention relates to addition polymers and more particularly to acrylonitrile copolymers.

Tertiary amines such as vinylpyridine have been employed in copolymerization with acrylonitrile to provide improved dyeability such as described in U. S. 2,491,471. More recently, quaternary ammonium compounds have been found to further improve the dyeability of many of the corresponding copolymers. Although these discoveries advance the art of obtaining dyeable textiles of desirable inertness to water, dry-cleaning agents, etc., the improvement at times is at the expense of other properties. Thus, the quaternary compounds when copolymerized with acrylonitrile can give rise to undesirable colors, particularly on heating as require in conventional methods for the fabrication of the polymer. Copolymers having simple quaternary ammonium units tend to exhibit a lack of thermal stability, particularly after soaping or other mild alkaline treatments. This defect is of importance where the copolymer is intended for textile or similar applications since the alkaline environment of washing followed by subsequent thermal treatment is comparable to that of conventional washing and ironing procedure. It is of course highly desirable for many applications that textile products not deteriorate under such treatment.

This invention has as an object the preparation of polymers. A further object is the preparation of an acrylonitrile copolymer possessing resistance to water and dry-cleaning agents, superior stability to alkali and heat treatments, and the ability to be modified by dyes, for example, with acid dyes. Another object is the preparation of an acrylonitrile copolymer having units of a comonomer. Other objects will appear hereinafter.

These objects are accomplished by the present invention of new addition polymers characterized by repeating units, mers, of a tertiary amine which has attached to one of the three valences of the nitrogen an allylic hydrocarbon radical, i. e., a monovalent aliphatic hydrocarbon radical of three to four carbons and of three chain carbons having but one unsaturation and that in a terminal ethylenic group, i. e., a vinylidene group bonded to the nitrogen through one methylene group, at least one of the remaining valences of said nitrogen being attached through a carbon containing chain of one to four carbons to at least one carbalkoxy group (wherein the alkoxy is of a lower (one to four carbon) alkyl), any remaining valence of the nitrogen being satisfied by a lower alkyl radical. Particularly useful monomers are those of the general formula

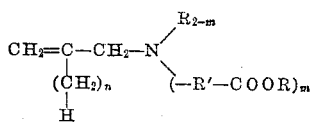

wherein $n$ is a cardinal number of up to one, $m$ is an integer of up to two, R is a lower alkyl radical and R' is a divalent hydrocarbon radical of up to four carbons. Accordingly, this invention includes polymers derived from monomers of the above general formula. The more useful polymeric materials are those wherein R' is a divalent hydrocarbon radical of at least two chain carbons between its free valences and $m$ equals 2, i. e., polymeric materials having a plurality of units of the formula

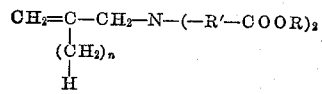

Such are especially useful in view of their availability, ease of polymerization to polymers which are readily dyed and are stable to the deleterious effects of heat after mild alkaline soap treatment, and particularly the acrylonitrile copolymers which contain from 0.5 to 10% of monomeric units of the above class. Such acrylonitrile copolymers generally have a molecular weight of at least 5000 and as high as 100,000 or higher.

The polymers, and particularly the copolymers, of this invention are obtained by the polymerization of the monomers, preferably in the presence of other polymerizable ethylenically unsaturated compounds, employing catalytic amounts of a free radical-generating polymerization catalyst to initiate the polymerization.

The following examples in which parts are by weight are illustrative of the invention.

EXAMPLE I

Acrylonitrile/dimethyl allyliminodipropionate (95/5) copolymer

To a solution of 0.342 parts of potassium dihydrogen phosphate in 190 parts of distilled water of pH of 7.0, was added 13 parts of acrylonitrile, 0.685 part of dimethyl allyliminodipropionate, 0.1888 part of thiourea and 5.68 parts of 3% hydrogen peroxide. The reaction mixture was flushed with nitrogen and the reaction bottle sealed. After standing with occasional shaking at room temperature for three hours, the reaction mixture was filtered and the white copolymer was washed with distilled water, then with 200 parts of methanol containing 2 parts of concentrated hydrochloric acid and finally with 160 parts of methanol. A total of 7.8 parts of copolymer was obtained having an inherent viscosity (0.2% in dimethylformamide) of 1.23. A film of this copolymer prepared by casting from a 15% solution in dimethylformamide exhibited very good dye receptivity to acid-type dyes in a dye bath having a pH of 3.0. This copolymer exhibited very good thermal stability both before and after a boil-off in ½% soap solution for ½ hour. Heating a boiled-off film sample for 20 minutes at 165° C. resulted in essentially no thermal decomposition of the copolymer.

EXAMPLE II

Acrylonitrile/dimethyl allyliminodiacetate (95/5) copolymer

This copolymer was prepared using the system described in Example I. From a polymerization system containing 0.342 of potassium dihydrogen phosphate, 13 parts of acrylonitrile, 0.685 part of dimethyl allyliminodiacetate, 0.1888 part of thiourea and 5.68 parts of 3% hydrogen peroxide in 190 parts of distilled water was obtained 6.2 parts of the copolymer having an inherent viscosity of 1.18 (0.2% in dimethylformamide). The properties of the copolymer were substantially the same as of the copolymer of Example I except the dye receptivity was not as high.

EXAMPLE III

Acrylonitrile/dimethyl methallyliminodiacetate (92.65/7.35) copolymer

This copolymer was prepared using the system described in Example I and using the same quantities of reagents with the exception that 1.03 parts of dimethyl methallyliminodiacetate was used as the comonomer. From this polymerization system a total of 2.5 parts of acrylonitrile/dimethyl methallyliminodiacetate copolymer was obtained. The properties of the copolymer were substantially the same as those of Example II.

EXAMPLE IV

*Acrylonitrile/dimethyl methallyliminodipropionate (95/5) copolymer*

This copolymer was prepared using the procedure described in Example I. A total of 6.0 parts of this copolymer was obtained from a reaction system containing 0.342 part of potassium dihydrogen phosphate, 0.685 part of dimethyl methallyliminodipropionate, 13 parts of acrylonitrile, 0.1258 part of thiourea and 3.78 parts of 3% hydrogen peroxide in 190 parts of distilled water. The copolymer obtained had an inherent viscosity of 1.59 (0.2% in dimethylformamide) and exhibited excellent dye receptivity to acid-type dyes over the pH range of 3.0 o 5.6. This copolymer also showed essentially no thermal decomposition when boiled for ½ hour in ½% soap solution followed by heating for 20 minutes at 165° C.

This invention is generic to polymers of tertiary amines which have attached to one valence of the nitrogen an allyl or methallyl radical, i. e., a monovalent aliphatic hydrocarbon radical of three to four carbons and three chain carbons having but one unsaturation and that in a terminal ethylenic group, or vinylidene, $CH_2=C<$, group bonded through one methylene group to the nitrogen and also attached to at least one of the valences of the nitrogen through a carbon containing chain of one to four carbons at least one carbalkoxy group wherein the alkoxy is of a lower (one to four carbon) alkyl radical, any remaining valence of the nitrogen being satisfied by a lower (one to four carbon) alkyl radical. The polymeric materials of the present invention are characterized by those which have a plurality of repeating units, or mers, of a monomer of the general formula

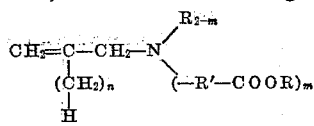

wherein $n$ is a cardinal number of up to one, $m$ is an integer of up to two, R is a lower alkyl radical and R' is a divalent hydrocarbon radical of up to four carbons.

The more useful monomers which are employed to give polymers and particularly copolymers of this invention are those wherein R' is a divalent saturated aliphatic hydrocarbon radical of at least two chain carbons between its free valences and $m$ equals 2. These monomers are iminobisdialkanoic acid esters wherein the third valence of the nitrogen is attached to a three to four carbon, three chain carbon, monovalent aliphatic hydrocarbon radical having but one unsaturation and that of a vinylidene group attached through one methylene group to the nitrogen. These have the formula

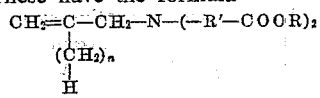

Particularly valuable copolymers with ethylenically unsaturated monomers, are obtained by the copolymerization of the lower (one to four carbon) alkyl diesters of allylimino- and methallylimino- dipropionic and -dibutyric acids. Thus, the methyl, ethyl, butyl esters can be employed.

The monomeric tertiary allyl- and methallylamines having carboxyl ester substituents which are the monomers and comonomers of the polymers of this invention can be prepared by the addition of an ester of an alpha, beta-ethylenically unsaturated acid to an allyl- or methallylamine which has at least one hydrogen and preferably two hydrogens on the nitrogen. See the copending application, Serial No. 288,011, filed May 15, 1952, by Theodore L. Cairns, now abandoned. This addition is illustrated by the addition of methyl acrylate, methyl methacrylate, etc., to allyl- or methallylamines, e. g., allylamine, methallylamine, N-methylmethallylamine, N-butylmethallylamine, etc. A further method consists in the reaction of allyl- or methallylamine with a lower alkyl ester of a monohalogenated lower alkanoic acid wherein the halogen is chlorine, bromine or iodine, e. g., ethyl monochloroacetate, butyl monobromoacetate, methyl gamma-bromo-n-butyrate, propyliodoacetate, etc. The reaction is carried out in the presence of an acid acceptor. A polymerization inhibitor is generally present during these reactions. Additional specific tertiary amines which can be polymerized and copolymerized to give the polymers, including copolymers, of this invention are methyl methylmethallylaminoacetate, dibutyl methallyliminodipropionate and dimethyl methallyliminodi(beta-ethylpropionate).

The polymerization of the carbalkoxy-containing allylic tertiary amines can be carried out with conventional polymerization catalysts. Ionic catalysts can be employed, particularly in the homopolymerization of these compounds. Copolymerization is however generally conducted with a free radical catalyst, e. g., an azo or peroxy compound or similar systems which initiate polymerization by formation of free radicals.

While the homopolymers of the present invention are of some utility in ion exchange resins, the principally useful polymers are the copolymers with addition polymerizable ethylenically unsaturated monomers, particularly those having but one ethylenic unsaturation. In these copolymers as little as 0.1% of the allylic tertiary amine carboxylic ester can produce a definite effect on dyeability. While this is of use in copolymers with, for example, vinyl chloride, vinylacetate, styrene, vinylidene chloride, methyl methacrylate, etc., a particularly important class of polymers is that obtained by the copolymerization of acrylonitrile with from 0.1 to 10%, based on the acrylonitrile, of the tertiary amine having one valence bonded to a three to four carbon, three chain carbon, monovalent aliphatic hydrocarbon radical whose only unsaturation is that of a vinylidene group attached through one methylene group to the nitrogen, at least one remaining valence of which is attached, through a carbon containing chain of one to four carbons, preferably hydrocarbon of at least two chain carbons between the free valences, to at least one carboxyl group esterified with a lower alkanol, any remaining valence being satisfied by a lower alkyl group. Particularly useful are these copolymers wherein the allylic amine is a diester of allylimino- or methallyliminodipropionic or di-butyric acid and the esterifying alkyl is methyl or ethyl. These copolymers for utility in textiles should have a molecular weight of at least 5000 and the molecular weight can be as high as 100,000 or more. Copolymers of this type have superior dye receptivity to acid-type dyes and possess stability to heat after treating with soap. These copolymers can be dyed with acid-type dyes under varying conditions of acid, for example, the dyeability is relatively constant within the range of pH 2 to pH 5 with acid dyes. Particularly preferred from the standpoint of properties of the copolymer are those which contain from 1 to 5% of the allylamine such as, for example, dimethyl methallyliminodipropionate.

The foregoing detailed description has been given for clearness of understanding only and no unnecessary limitations are to be understood therefrom. The invention is not limited to the exact details shown and described for obvious modifications will occur to those skilled in the art.

What is claimed is:

1. A polymer of a diester, with a lower alkanol, of an N-methallyliminodialkanoic acid wherein the alkanoic acid radicals are of up to five carbons.

2. A polymer of a lower alkyl diester of N-methallyliminodipropionic acid.

3. A polymer of a diester, with a lower alkanol, of an N-allyliminodialkanoic acid wherein the alkanoic acid radicals are of up to five carbons.

4. A polymer of a diester, with a lower alkanol, of an iminodialkanoic acid wherein the third valence of the imino nitrogen, that not bonded to the alkanoic radicals, is bonded to a three to four carbon, three chain carbon, monovalent aliphatic hydrocarbon radical whose only unsaturation is that of a vinylidene group attached through one methylene group to the nitrogen.

5. An acrylonitrile copolymer, of improved dyeing properties, containing 0.1 to 10%, based on the weight of the acrylonitrile, of units of a diester, with a lower alkanol, of an iminodialkanoic acid wherein the third valence of the imino nitrogen, that not bonded to the alkanoic radicals, is bonded to a three to four carbon, three chain carbon, monovalent aliphatic hydrocarbon radical whose only unsaturation is that of a vinylidene group attached through one methylene group to the nitrogen.

6. A polymer of a tertiary amine which has but one carbon to carbon unsaturation and wherein one valence of the amino nitrogen is bonded to a three to four carbon, three chain carbon, monovalent aliphatic hydrocarbon radical having one unsaturation and that of a vinylidene group bonded, through one methylene group, to the nitrogen which has at least one other valence bonded, through a chain containing one to four carbons to at least one carboxyl group esterified with a lower alkanol, any remaining valence of the nitrogen being satisfied by a lower alkyl group.

7. A copolymer of acrylonitrile containing 0.1 to 10%, based on the weight of the acrylonitrile, of a tertiary amine which has but one carbon to carbon unsaturation and wherein one valence of the amino nitrogen is bonded to a three to four carbon, three chain carbon, monovalent aliphatic hydrocarbon radical having one unsaturation and that of a vinylidene group bonded, through one methylene group, to the nitrogen which has at least one other valence bonded, through a chain containing one to four carbons to at least one carboxyl group esterified with a lower alkanol, any remaining valence of the nitrogen being satisfied by a lower alkyl group.

8. A polymer of a tertiary amine wherein one valence of the amino nitrogen is bonded to a three to four carbon, three chain carbon, monovalent aliphatic hydrocarbon radical having one unsaturation and that of a vinylidene group bonded, through one methylene group, to the nitrogen which has at least one valence bonded through a bivalent saturated aliphatic hydrocarbon radical of one to four carbons to a carboxyl group esterified with a lower alkanol, any remaining valence of the nitrogen being satisfied by a lower alkyl group.

9. A copolymer of acrylonitrile containing 0.1 to 10%, based on the weight of the acrylonitrile, of a tertiary amine wherein one valence of the amino nitrogen is bonded to a three to four carbon, three chain carbon, monovalent aliphatic hydrocarbon radical having one unsaturation and that of a vinylidene group bonded, through one methylene group, to the nitrogen which has at least one valence bonded through a bivalent saturated aliphatic hydrocarbon radical of one to four carbons to a carboxyl group esterified with a lower alkanol, any remaining valence of the nitrogen being satisfied by a lower alkyl group.

10. A polymer of a diester, which diester has the formula

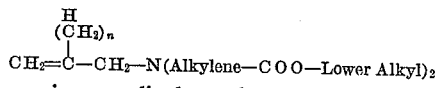

wherein $n$ is a cardinal number not greater than one.

11. An acrylonitrile copolymer, of improved dyeing properties, containing 0.1 to 10%, based on the weight of the acrylonitrile, of units of a diester, which diester has the formula given in claim 10.

12. An acrylonitrile copolymer, of improved dyeing properties, containing 0.1 to 10%, based on the weight of the acrylonitrile, of units of a diester, with a lower alkanol, of N-methallyliminodipropionic acid.

References Cited in the file of this patent

UNITED STATES PATENTS

| 2,258,718 | Rothrock | Oct. 14, 1941 |
| 2,327,985 | Alderman et al. | Aug. 31, 1943 |
| 2,378,169 | Agre et al. | June 12, 1945 |
| 2,601,251 | Bruson | June 24, 1952 |
| 2,628,224 | Cairns et al. | Feb. 10, 1953 |

OTHER REFERENCES

Chemical Abstracts 43, 2226 (1949).